(12) United States Patent
Hakim et al.

(10) Patent No.: US 8,849,687 B2
(45) Date of Patent: Sep. 30, 2014

(54) METHOD AND SYSTEM FOR SCHEDULING THE DISCHARGE OF DISTRIBUTED POWER STORAGE DEVICES AND FOR LEVELIZING DISPATCH PARTICIPATION

(75) Inventors: David Hakim, Silver Spring, MD (US); Steven Hugg, Bethesda, MD (US); Edward Shnekendorf, Falls Church, VA (US); Sarah Cartwright, Washington, DC (US); Zach Axelrod, Washington, DC (US); Nicholas Jhirad, Washington, DC (US); Louis Szablya, Houston, TX (US); R. Karl Lewis, Great Falls, VA (US); Brian Golden, Great Falls, VA (US); Michaela Barnes, Bethesda, MD (US); Alexei Cowett, Arlington, VA (US); David Hyams, McLean, VA (US)

(73) Assignee: GridPoint, Inc., Arlington, VA (US)

( * ) Notice: Subject to any disclaimer, the term of this patent is extended or adjusted under 35 U.S.C. 154(b) by 1156 days.

(21) Appl. No.: 12/118,644

(22) Filed: May 9, 2008

(65) Prior Publication Data
US 2008/0281663 A1 Nov. 13, 2008

Related U.S. Application Data

(60) Provisional application No. 60/916,861, filed on May 9, 2007.

(51) Int. Cl.
| | |
|---|---|
| *G06Q 10/00* | (2012.01) |
| *B60L 11/18* | (2006.01) |
| *H02J 3/38* | (2006.01) |
| *H02J 3/00* | (2006.01) |
| *H02J 3/46* | (2006.01) |
| *G06Q 10/06* | (2012.01) |

(52) U.S. Cl.
CPC .. *H02J 3/46* (2013.01); *Y04S 30/14* (2013.01); *B60L 11/1846* (2013.01); *B60L 11/1824* (2013.01); *H02J 3/383* (2013.01); *Y02T 10/7088* (2013.01); *B60L 11/1844* (2013.01); *Y02T 90/169* (2013.01); *Y04S 10/126* (2013.01); *B60L 11/184* (2013.01); *Y02E 10/563* (2013.01); *B60L 11/1842* (2013.01); *Y02T 10/7005* (2013.01); *B60L 2200/26* (2013.01); *H02J 3/008* (2013.01); *Y02T 90/128* (2013.01); *Y02E 60/721* (2013.01); *Y02T 90/14* (2013.01); *Y04S 50/10* (2013.01); *B60L 2240/72* (2013.01); *B60L 11/1848* (2013.01); *G06Q 10/06315* (2013.01); *Y02T 90/163* (2013.01)
USPC .......................................................... 705/7.13

(58) Field of Classification Search
CPC ................................................. G06Q 10/06311
USPC .......................................................... 705/7.13
See application file for complete search history.

(56) References Cited

U.S. PATENT DOCUMENTS

| | | | |
|---|---|---|---|
| 2005/0008904 A1* | 1/2005 | Suppes | 429/9 |
| 2006/0047369 A1* | 3/2006 | Brewster et al. | 700/291 |
| 2008/0177678 A1* | 7/2008 | Di Martini et al. | 705/412 |

OTHER PUBLICATIONS

Pillai, Anju S. and Isha, T.B.; EC-A: A Task Allocation Algorithm for Energy Minimization in Multiprocessor Systems; 2013, Middle-East Journal of Scientific Research 18, pp. 779-787.*

*Primary Examiner* — Justin M Pats
*Assistant Examiner* — Amanda Gurski
(74) *Attorney, Agent, or Firm* — Greenberg Traurig LLP

(57) ABSTRACT

Disclosed is a computerized method for dispatching energy from distributed resources in a discharge event so that the energy stored in individual devices is levelized, or so that an operator request is met. Evaluation of event parameters may be deferred. The method may be utilized to dispatch energy from plug-in electric vehicles. Systems and methods to account for electricity dispatched to or from electric vehicles are disclosed. Systems and methods for incentivizing consumers to participate in a dispatch event or curtail energy use are disclosed.

17 Claims, 11 Drawing Sheets

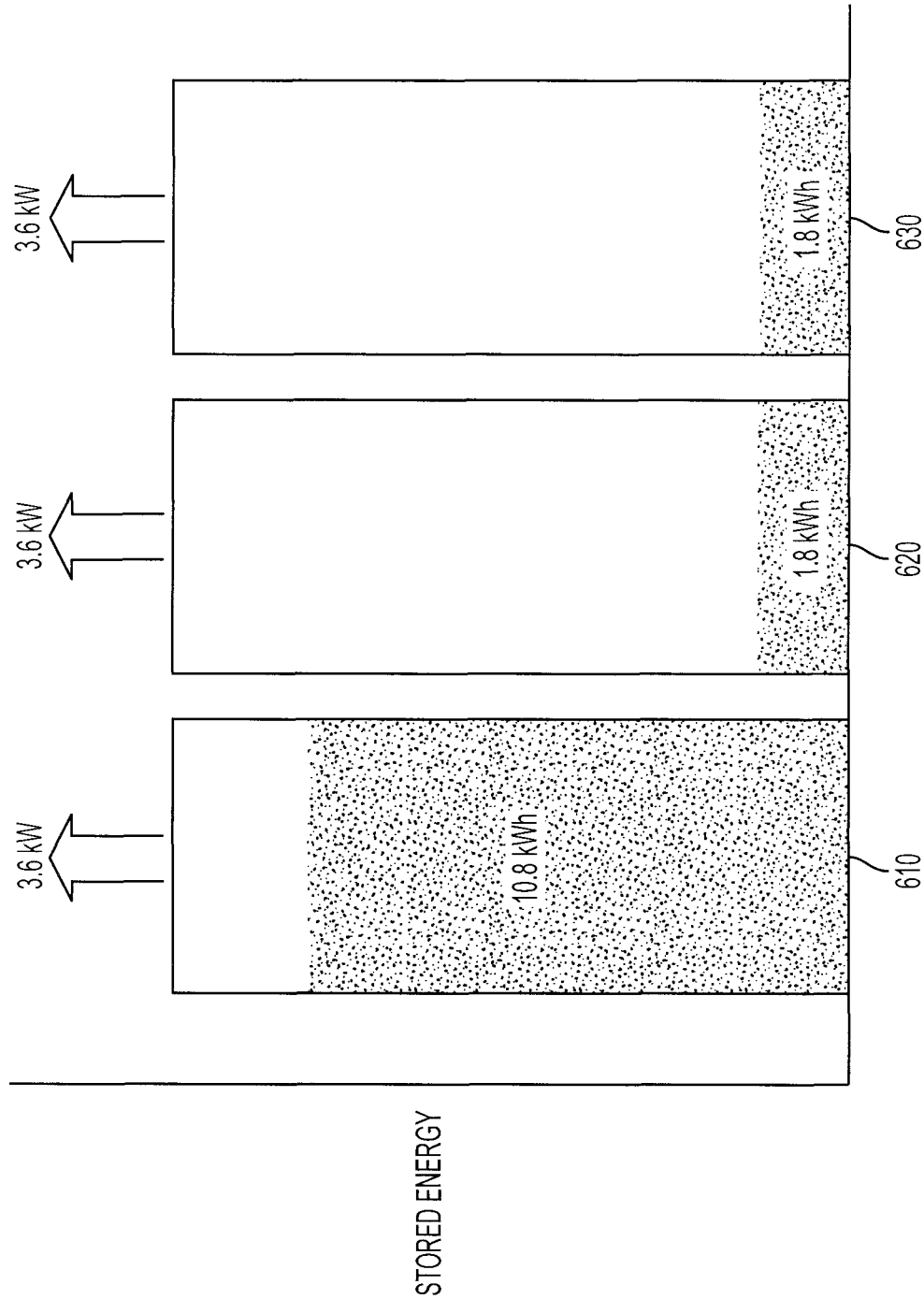

FIG. 9

METHOD AND SYSTEM FOR SCHEDULING THE DISCHARGE OF DISTRIBUTED POWER STORAGE DEVICES AND FOR LEVELIZING DISPATCH PARTICIPATION

This application claims the benefit of U.S. Provisional Application No. 60/916,861, entitled Method and System for Scheduling The Discharge Of Distributed Power Storage Devices And For Levelizing Dispatch Participation, filed May 9, 2007, which is herein incorporated by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of electric power distribution systems, and in particular to methods and systems for the discharge of stored energy from distributed energy resources.

BACKGROUND OF THE INVENTION

Work scheduling of centralized electricity generation, such as from electricity power plants, is known. Such work scheduling includes, e.g., scheduling of discharge and curtailment events. However, known solutions are poorly applicable for determining optimal schedules for distributed energy resources, such as distributed consumer electrical power generation devices and distributed power storage devices such as batteries in consumer power control appliances. Such distributed energy resources are described in U.S. patent application Ser. No. 11/968,941 entitled "Utility Console for Controlling Aggregated Energy Resources" filed Jan. 3, 2008, which is incorporated herein by reference in its entirety. Known solutions for scheduling discharge and curtailment events are particularly inapplicable to distributed energy resources where the quantity of such resources is relatively large and where the discharge capability varies for each unit.

One distributed energy resource is plug-in electric vehicles ("PEVs"). A PEV is any vehicle such as a car, truck, bus, motorcycle, etc that draws electricity from a power distribution network ("grid"), stores the electricity through some means, and uses electricity to power the vehicle. A PEV may come in a variety of forms, including hybridized drivetrain and electric-only drivetrain vehicles.

Hybridized drivetrain vehicles use a combination of electricity drawn from the grid and on-board motive force that may be used to both drive the vehicle and/or as a generation source to extend the range of the vehicle by augmenting the on-board electricity storage. The on-board motive force/generation source can include a variety of power plants including gasoline, diesel, bio-fuel combustion engines driving a generator. Or the on-board electricity generation may come from more advanced means such as fuel cells that use hydrogen, or other fuels to generate a flow of electricity. In the future, it is possible that some part of the electricity generation will come from photo-voltaic generation, kinetic energy capture, or advanced technology means. In general, most hybridized drivetrains generate additional electricity for on-board storage through regeneration by using the motor as a generator during coasting and braking operations.

Electric-only drivetrain vehicles use only an electric motor(s) to provide motive force coupled with sufficient electricity storage to provide suitable driving characteristics and range. As with the hybridized drivetrain, the energy storage may be in a variety of forms: chemical batteries, electrostatic capacitive storage, or a combination of the two. Other forms of energy storage may include electro-kinetic such as flywheels, or thermal methods that rely upon the energy captured and released during phase-change operations. The electric-only drivetrain may use regeneration (see above) to capture electricity for storage to extend the range of the vehicle. In addition, there is the potential to use extra-vehicular means to generate or transfer electricity into the car for direct motive force or to supplement the energy storage. Examples of this include magneto-coupling built into roadways, linear generators embedded into roadways, or other means not yet contemplated that involve interaction between the vehicle and its environment.

The amount of electricity storage on the vehicle varies as to whether it is a hybridized or an all-electric configuration. Current development efforts by the automotive community indicate that a hybridized drivetrain requires 12-16 kWh of on-board energy storage and that all electric vehicles will require 50-60 kWh of energy storage, depending upon desired range and performance characteristics. The primary limiting factors of the storage capacity remain both physical size, weight, and cost of the storage medium. The secondary limiting factors will be crashworthiness, replenishment times, and electrical infrastructure within the home or at commercial charging stations. As new materials and methods come to market, the on-board storage capacity will increase over time with the significant possibility that an all-electric drivetrain will be prevalent in the daily transportation vehicles on the road.

While the PEV has tremendous consumer and societal benefits, it potentially has a significant negative impact on electric grid operations. This is due to the charging requirements of the vehicle and innate consumer behavior. For example, a PEV that has 16 kWh of energy storage that is depleted 80% every day will require 12.8 kWh of replenishment before use again the next day. A typical 110V wall outlet of 20 amp capacity—with many only at 15 amps—limits the current draw to roughly 2000 watts. Charge management algorithms for chemical batteries are non-linear with a decrease in current flow into the batteries when they are both near empty and near full. As such, the charge time is extended beyond the six hours normally expected in this case if the charging cycle was linear. The amount of "stretch" required for optimal charge management varies by battery type and manufacturer.

The combination of the high draw rate (2000 watts), the time required (6-8 hours) to replenish the stored energy, and the timing of the consumer places a significant burden on the electric power delivery system when millions of PEVs are on the road. Once the energy storage device is in "bulk charge" mode—neither almost empty nor almost full—it is drawing current at a 100% duty cycle. This is unlike any other major consumption item within most households except lighting, which generally accounts for a relatively small percentage of electricity consumption.

Consumer driving habits factor into the problem as well. Assuming that PEVs are used as commuter vehicles, then the typical driving pattern is to unplug in the morning, drive 30-50 miles per day round trip, and then come home between 6 pm and 7 pm to plug the vehicle back into the grid for replenishment. When compared to the average peak draw of a household over the period of one hour, the PEV at 110V/20 A current flow effectively doubles the consumption of the house during a typical evening peak demand period. This level of consumption is not planned for in the generation or distribution capacity of electric service providers. With as little as a few hundred PEVs on a distribution feeder, there can be significant delivery issues for the electric utility. With as little as a few thousand within a service territory charging at peak, there can be significant issues related to generation capacity.

Electric only drivetrains with 50-60 kWh of storage exacerbate this problem further. Normal daily driving habits will probably not drain the stored energy beyond that expected by the hybridized drivetrain. However, a longer daily use pattern, or long trips will require up to three times the replenishment time at 110V/20 A, which results in up to 18 hours of charge time, which is not practical for most applications. While the circuits to support replenishment can be upgraded to 220V at high current limits, the energy storage characteristics will determine how much current can be flowed into the device without damage. However, the larger the current draw, the larger the problem for effective grid management.

SUMMARY OF THE INVENTION

In an embodiment, the invention provides a computerized method for dispatching energy from distributed resources in a discharge event so that the energy stored in individual devices is levelized. A dispatch request including an amount of power required during a dispatch event and a duration of the event is received, and accomplishability of the dispatch request is determined. Individual resource participation in the dispatch event is determined utilizing rules that set the amount of energy to be discharged from each participating resource so as to keep the level of energy stored in each individual resource equal relative to the energy level of other participating resources. Individual resource dispatches are then scheduled, and the resources are commanded to dispatch energy at their appointed time.

In another embodiment, the invention provides a computerized method for dispatching energy from distributed resources to meet an operator request. A dispatch request including an amount of power required during a dispatch event and a duration of the event is received, and accomplishability of the dispatch request is determined. Individual resource participation in a planned dispatch event is then determined, and individual resource dispatches are scheduled at a future time. At that time, the individual resources are commanded to dispatch energy.

In another embodiment, the invention provides a computerized method for dispatching energy from distributed resources that defers evaluation of event parameters. A dispatch request is received, and a determination is made of the accomplishability of the dispatch request. Individual resource participation in a planned dispatch event is then determined. Individual resource dispatches are scheduled at a future time. Accomplishability of the dispatch request is redetermined prior to said future time, and individual resources are commanded to dispatch energy based upon such re-determination of accomplishability.

In another embodiment, the invention provides a computerized method for dispatching energy from plug-in electric vehicles. A dispatch request is received, and accomplishability of the dispatch request is determined. A data network is used to determine availability of individual PEVs at a requested future time for a dispatch event. Resource participation in a planned dispatch event is determined based upon such availability. Individual PEV dispatches are scheduled at the future time. Individual resources are commanded to dispatch energy at such time.

In another embodiment, the invention provides a method of receiving and transmitting data to account for electricity flowing through a charging receptacle to or from a storage device in an electric vehicle. A clearinghouse receives a request for authorization that has been generated in response to connection of an electric vehicle to a charging receptacle, the request for authorization including identification data sufficient to identify a first account of a first utility company supplying electricity to said charging receptacle and to identify an electricity billing account associated with an account holder at a second utility company. A determination is made that the account holder is authorized to charge said account for electricity drawn from the charging receptacle. Data is transmitted to enable the flow of electricity at the charging receptacle. Data indicating the amount of electricity drawn from the charging receptacle to charge the storage device in said electric vehicle is received by the clearinghouse. The data is used to cause the account associated with the first utility company to be credited and the utility company account to be charged.

In other embodiments, the invention provides systems and methods for incentivizing consumers to participate in a dispatch event or curtail energy use.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 3A illustrates the dispatch of hypothetical distributed resources;

FIG. 9 shows one example of a user interface; and

DETAILED DESCRIPTION

The present invention is described below with reference to figures, block diagrams and operational illustrations of methods and devices to manage power generation, consumption, and storage. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

The operator of a utility control system, if given a request to dispatch or curtail some aggregate total amount of energy (or power) at some point in the future, may attempt to meet this request by commanding a distributed set of energy resources to individually produce or curtail at such future point a certain amount of energy (or power). Examples of energy resources may include various types of batteries. Energy resources may also include devices or systems for generating electricity. Other examples of energy resources may include power consuming devices, such as appliances, which if turned off or removed from the grid reduce the amount of demand for power from the grid, thus freeing up grid capacity. These may all be referred to as "distributed resources" as well.

Figure 1:
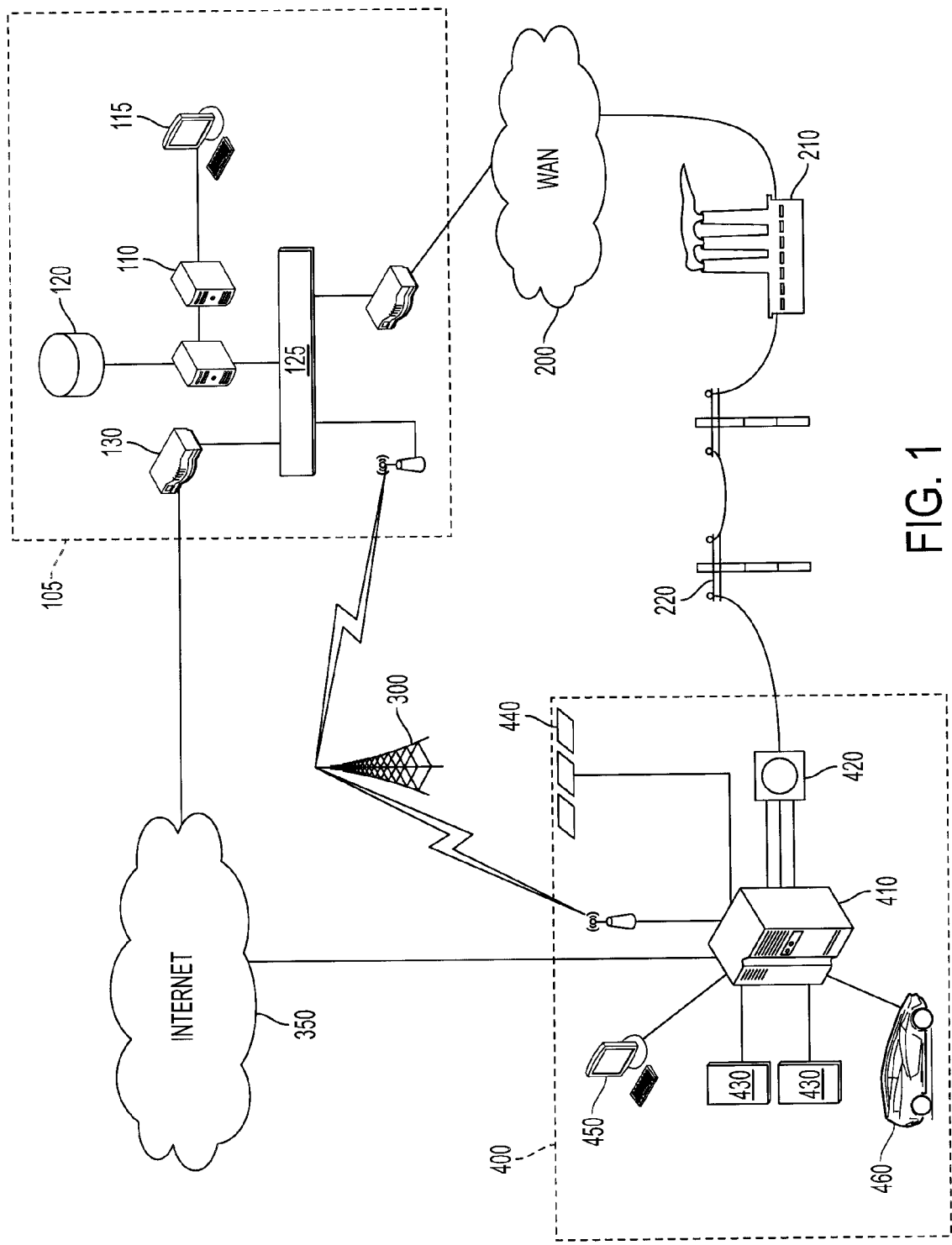
FIG. 1 illustrates one embodiment of a system which is capable of supporting the dispatch of energy from distributed energy resources.

FIG. 1 illustrates one embodiment of a system and network which is capable of supporting the dispatch of energy from distributed energy resources. An electrical utility has an operations control center 105. Within the control center 105, one or more servers 110 host applications software which implement various applications including a utility console. The servers 110 provide information to a display device 115 capable of supporting a user interface. The servers 110 are additionally connected to one or more storage devices 120 which may provide for storage of one or more actively used databases or which may provide backup or archiving of data collected by the servers. An example of applications software described above is disclosed in U.S. patent application Ser. No. 11/968,941 entitled "Utility Console for Controlling Aggregated Energy Resources" filed Jan. 3, 2008, which is incorporated herein by reference in its entirety.

The servers are connected to the local network 125 of the operations control center. The local network 125 is connected to the Internet 350 though conventional routers and/or firewalls 130. The local network 125 may also be connected to a common carrier wireless network or a private network 300. The local network 125 is also connected to a wide area network 200 which is connected to one or more power generation points 210.

Power consumers 400 in the service territory of the utility have one or more power control appliances 410. Power control appliances 410 may include one or more energy storage units, such as batteries (not shown). Power is transmitted to the consumer 400 over transmission lines 220 which form part of the local power grid. Power drawn by a consumer from the grid may be supplied, in part, by one or more power generation points 210, or may originate in remote locations (not shown). Power enters the consumer premises at a meter 420 and is routed to the power control appliance 410, which may comprise an onboard computer, energy storage, and an inverter/charger.

Power transmission lines 220 can additionally support transmission of data between the power generation point 210 and power consumers 400. The power generation point 210 is connected to the operations control center 105 through the wide area network (WAN) 200 and is connected to consumers 400 though power transmission lines 220. Thus, the servers 110 may receive data from or transmit data or commands to distributed energy management controllers 410 using the Internet 350, the wireless network 300, or the WAN 200.

The power control appliance 410 may be configured to control one or more electrical circuits which supply power to one or more power consuming devices 430, such as household appliances. Power control appliance 410 may also be configured to supply electricity to, or to draw electricity from, a mobile device capable of energy storage, such as a plug-in electric vehicle (PEV) 460. In one embodiment, the system uses a number of load controllers with integrated measurement and/or a communicating thermostat (not shown). Load controllers with integrated measurement can be installed by placing them inline with the circuit to be measured and controlled, and may be installed near the main load panel (though there is no requirement to do so). Any number of load controllers with integrated measurement may be installed at a site. The power control appliance 410 may additionally have control connections to the power consuming devices 430 which allow the power control appliance 410 to control the operation of the power consuming devices 430.

The power control appliance 410 may be further connected to one or more power generation devices 440, such as solar panels, which are capable of generating power. Power generated by the power generation devices 440 may is routed to the power control appliance 410 for use by the consumer. Under the control of the power control appliance 410 power generated by the power generation devices 440 may also be routed, in whole or in part, to the power grid 220. It may also be stored in storage batteries, or in the storage capacity of a PEV.

The power control appliance 410 may be controlled at least in part by the consumer using a user interface displayed on a display device 450. Display device 450 may be a mobile device capable of supporting a user interface. Device 450 may connect directly to the Internet 350, the wireless network 300, or the WAN 200, or it may connect through power appliance 410. Power control appliance 410 may be further controlled remotely by the utility control center 105, for example, over the Internet 350, or over a common carrier wireless network 300. In one embodiment, the servers 110 at the utility control center 105 may receive and transmit data and commands to the power appliance using the Internet 350, the wireless network 300, or the WAN 200.

Further examples of power control appliances which may be used in embodiments of the system illustrated in FIG. 1 are described in U.S. Pat. No. 7,274,975, entitled "Optimized Energy Management System."

In order to match electricity supply and demand, a utility control system operator may desire to curtail load or dispatch energy from distributed energy resources. One method of meeting a request to dispatch or curtail energy is to command individual distributed energy resources differently, based on the state of each energy resource at the time the command is executed, while at the same time attempting to ensure that the sum of all the individual actions meets the requirements of the overall request. In addition, it is desirable to dispatch stored energy in such a way so as to preserve as much as possible the ability to meet subsequent dispatch requests.

Figure 2:
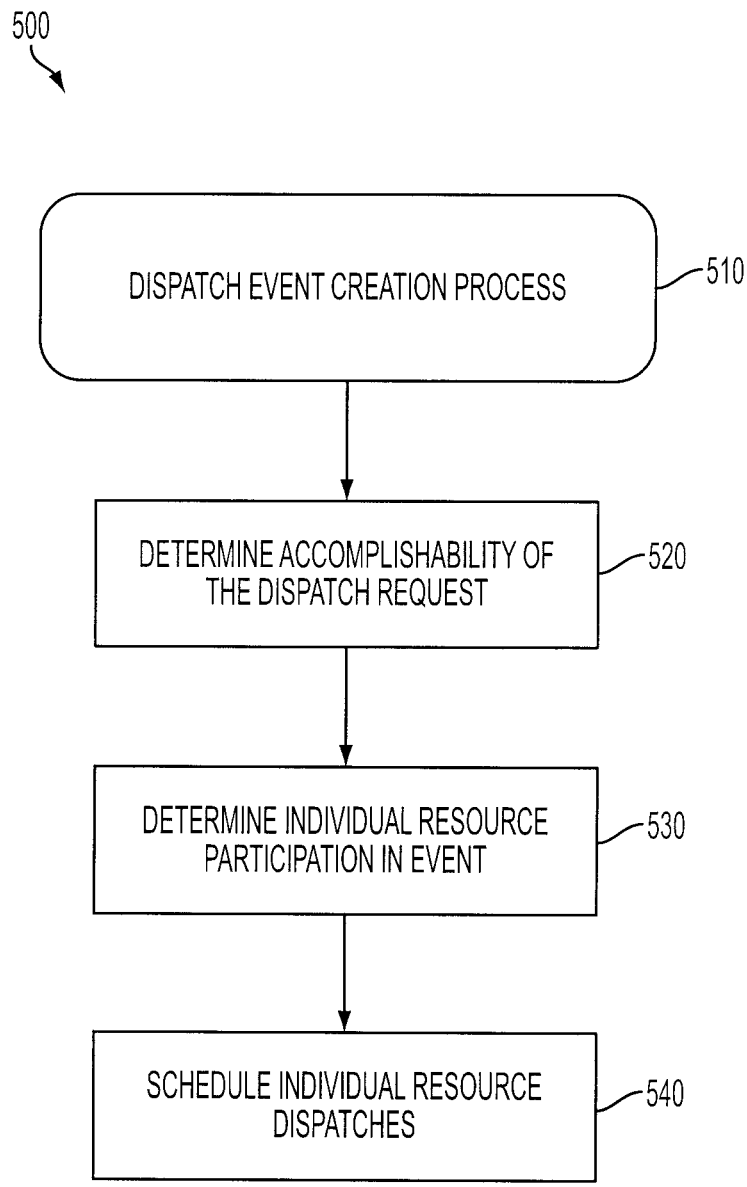
FIG. 2 shows a block flow diagram illustrating the steps of levelizing and scheduling the dispatch of distributed energy resources.

FIG. 2 shows a block flow diagram illustrating the steps of levelizing and scheduling the dispatch of distributed energy resources 500. Using information provided to the utility control center 105 by distributed energy resources, such as, for example, current stored capacity and rate of discharge, a utility creates a dispatch event 510 using a control system such as that described above in, for example, the utility control center 105. Specifications for the dispatch event include the amount of power desired during the event and the duration of the dispatch event. Next, the accomplishability of the requested dispatch event is determined 520. Next, if the dispatch request is accomplishable, the amount of energy to be discharged from each participating unit is determined 530. Then, the energy dispatch of individual units is scheduled and the instructions for each distributed resource are determined 540. These steps are further described below. It should be understood that distributed energy resources can mean any device capable of storing and discharging electricity and communicating with a system such as shown in FIG. 1. Distributed energy resources include the energy storage batteries of power control appliance 410, consumer power generation devices such as solar panels or generators, and the mobile energy storage capabilities of PEV 460 or any other mobile energy storage device.

Given the specifications for a dispatch event, the accomplishability of the requested dispatch event is determined in step 520. One example of determining the accomplishability of a dispatch event is discussed below.

For example, with reference to FIG. 3A, consider three energy storage devices 610, 620, and 630. Devices 620 and 630 contain 1.8 kWh of stored energy, and device 610 contains 10.8 kWh of stored energy. Each device is capable of releasing (dispatching) its stored energy at 3.6 kW. A request for a constant 10.8 kW dispatch over a 1 hour period may at first seem accomplishable because there is sufficient stored energy to meet the dispatch request.

However, in fact the dispatch is not accomplishable because all three units would be required to dispatch at 3.6 kW (their maximum rate), and at that rate devices 620 and 630 would run out of energy in half an hour. This is shown by the inequality $$10.8 = K > \sum_i^n \min\left(Y, \frac{E(i)}{d}\right) = 1.8 + 1.8 + 3.6 = 7.2$$

where the rate is given by K and the duration given by d, for n distributed energy storage devices capable of releasing stored energy at a constant rate Y, where the amount of energy stored in the i'th device (fuel) is given by E(i). In other words, if the conditions expressed in the inequality are met, a dispatch request is accomplishable.

If the energy level in every device were equal, then the above formula would become $$K \leq \sum_i^n \min\left(Y, \frac{E}{d}\right) = \min\left(nY, \sum_i^n \frac{E}{d}\right).$$

This result has several implications. First, when the energy levels in storage devices are kept equal, the rate at which energy can be dispatched over a fixed duration is maximized. Second, when the energy stored in each individual device is levelized (i.e. kept equal relative to the energy level of other available resources), a set of distributed generation or stored energy resources may be treated as a single large aggregate energy storage device, with a maximum dispatch rate equal to the sum of all the individual dispatch rates, and the stored energy equal to the sum of all the stored energies. Third, over multiple dispatch events where energy is dispatched from different sub-groups of energy storage devices, minimizing the variance in energy storage levels maximizes the ability to meet future dispatch requests.

In step 530, if a dispatch request is accomplishable, the amount of energy to be discharged from each participating unit is determined. For example, with reference to FIG. 3B, consider a hypothetical situation where two dispatch requests are made for three distributed resources, A, B, and C, each capable of dispatching energy at 3.6 kW and all initially filled with 10.8 kWh of energy. The first request is for 7.2 kW for 3 hours starting at time t, and the second request is for 10.8 kW, lasting for 1 hour, to begin at t+3 hours.

Figure 3B:
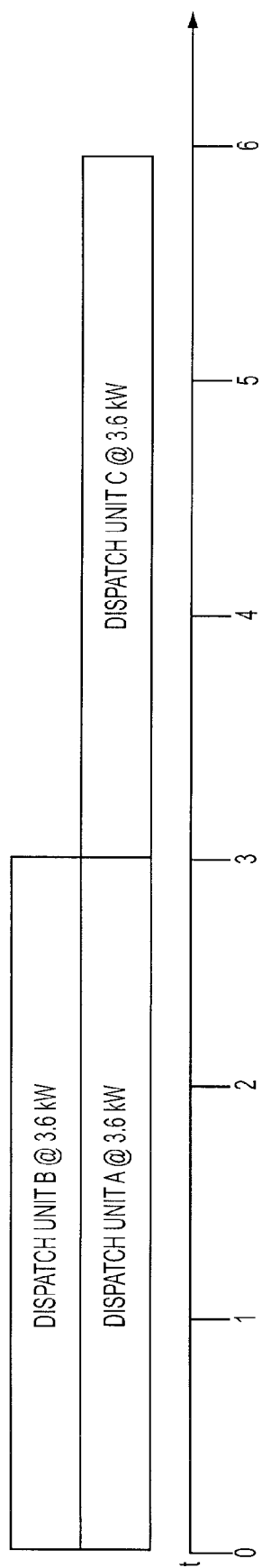
FIG. 3B shows a representation of hypothetical dispatch requests for distributed resources.
Figure 3C:
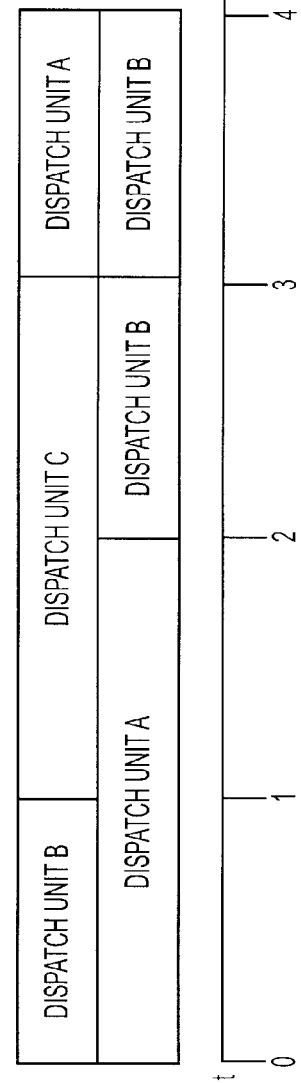
FIG. 3C illustrates a levelized dispatch of distributed resources.

Whether the second dispatch is accomplishable depends on how the first dispatch is performed. The first dispatch could be performed by instructing devices A and B to dispatch at their maximum rate for the full three hour period, as shown in FIG. 3B. However, in that case the second dispatch is not accomplishable because units A and B have been drained of all their stored energy, and unit C is only capable of dispatching at a rate of 3.6 kW. If, however, the first dispatch levelized the stored energy of each of the three units, one example of which is shown in FIG. 3C, then the second dispatch would be accomplishable.

One example of an algorithm for determining participation information for an accomplishable dispatch that maximally reduces variance among the stored energy in the distributed resources is provided. Other equivalent embodiments of this specific method should be readily apparent to one of ordinary skill in the art without departing from the scope of the method disclosed here.

n=number of units that can be considered, Y=the rate in kW that an individual unit can dispatch, and E(i)=a function returning the initial energy in each unit. The specification for a dispatch request (assumed to be accomplishable) include the number of kW requested (K) and the duration of the dispatch, (d).

```
M := S := { }
U := All available units
c := 0
D[i] := 0
let R(i) = E(i) − D[i]
while(c < dK)
    if (|S| = 0)
        I := {i ∈ U : R(i) = max(R(i))} ; S = I ; U = U − I
    r := R(i) : i ∈ S
    e := min((dK − c)/|S|,dY − max(D[i]) : i ∈ S,r − max(R(i)) : i ∈ U)
    c := c + e|S|
    ∀i ∈ S : D[i] = D[i] +e
    if (c < dK)
        I := {i ∈ S : D[i] = dY} ; M := M ∪ I ; S := S − I
        r := R(i) : i ∈ S
        I := {i ∈ U : R(i) = r} ; S := S ∪ I ; U := U − I
```

Once completed, every unit for which i∈M∪S will be scheduled to dispatch for $$\frac{D[i]}{Y}$$

hours in order to meet the dispatch request.

Next, in step 540, when participation information has been determined for distributed resources in an accomplishable discharge event, the energy dispatch of individual units is scheduled and the instructions for each distributed resource are determined. One example of a method of scheduling the dispatch is provided. Other equivalent embodiments of this specific method should be readily apparent to one of ordinary skill in the art without departing from the scope of the method disclosed here.

Let ScheduleDispatch(i,$t_{start}$,$t_{end}$) be a function which commands unit i to dispatch between the times $t_{start}$ and $t_{end}$ $$t := t_0$$
$$\text{foreach } (i \in I)$$
$$\text{if}\left(t - t_0 + \frac{D[i]}{Y} < d\right)$$
$$\quad \text{ScheduleDispatch}\left(i, t, t + \frac{D[i]}{Y}\right)$$
$$\quad t := t + \frac{D[i]}{Y}$$
$$\text{else}$$
$$\quad \text{ScheduleDispatch } (i, t, t_0 + d)$$
$$\quad \text{ScheduleDispatch}\left(i, t_0, t + \frac{D[i]}{Y} - d\right)$$
$$\quad t := t + \frac{D[i]}{Y} - d.$$

However, the method described above does not take into account any minimum dispatch time which a given resource may have (e.g., because of the physical constraints of the storage unit). It also does not address the "splitting" of the dispatch of units from the end of the dispatch back to the beginning, as shown occurring with unit B in FIG. 3C, which shows unit B scheduled for discharge from time t to time t+1, and again from time t+2 to t+3. A method of scheduling accomplishable discharges which addresses these issues is provided below. Other equivalent embodiments of this specific method should be readily apparent to one of ordinary skill in the art without departing from the scope of the method disclosed here.

Figure 4:
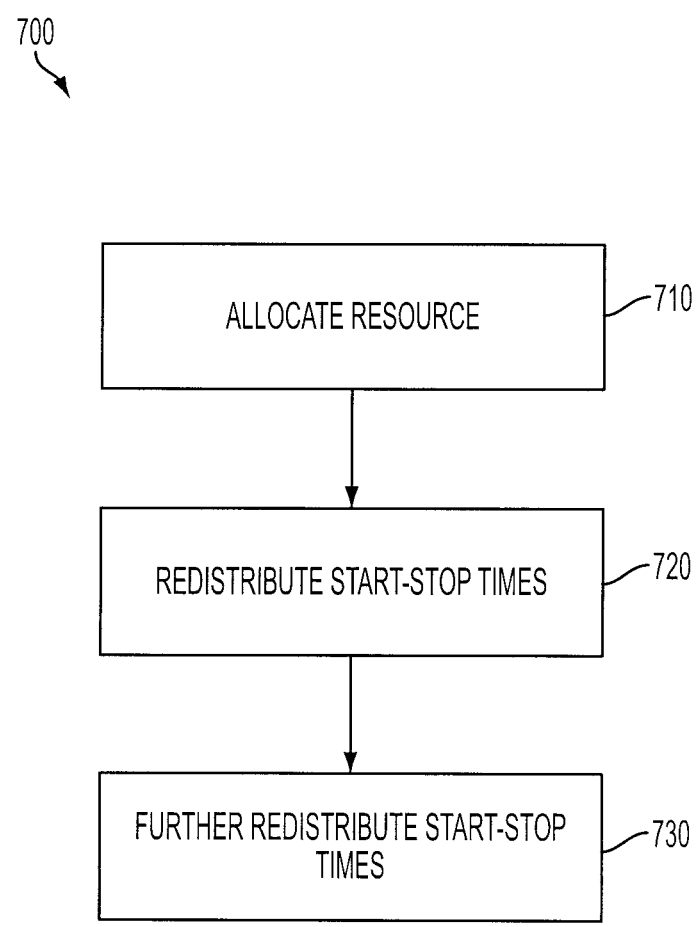
FIG. 4 shows a block flow diagram of a method of scheduling the dispatch of distributed resources.

FIG. 4 shows a block flow diagram of a method 700 of scheduling the dispatch of distributed resources. First, resources are allocated for the discharge event 710. Next, in step 720 the start and stop times of the allocated resources are redistributed to minimize any coincidental starting or stopping of the discharge of resources. This is done to minimize the "ripple" (i.e., fluctuations in power) on the electrical grid which may be caused by multiple resources starting or stopping simultaneously. Finally, the start time of each resource is further changed by the addition of a factor, to further minimize ripple. Each step is further described below.

Figure 5:
FIG. 5 illustrates a method of scheduling the dispatch of distributed resources.

In step 710, resources are allocated for the discharge event. One way to schedule resources over time is by use of a "bin-packing" method. Resources are selected to fulfill the power and duration requirements of the dispatch request. Referring to FIG. 5, in one embodiment, discharge intervals I(i) are scheduled for the number of participating storage devices (N) using a bin-packing algorithm where T is the maximum length of a bin. In FIG. 5, a filled bin is shown at reference number 810. Many known bin-packing algorithms may be applied to step 710, such as the first-fit-first-descending algorithm.

The purpose of step 710 is to create full bins, since intervals in a full bin will not require splitting. I(i) must be equal to or less than T, and both quantities must be specified as positive non-zero integers. Each storage unit is assumed to have constant and identical discharge rates, and thus the only parameter needed for each device is the duration of discharge. Units should be chosen such that the time quantum is also the minimum allowable discharge time of any unit.

Discharge intervals I(i) are redistributed in step 720. Full intervals (F) are reordered to remove even ordering which may be imposed by the allocation in step 710. In one embodiment, a hash function may be applied to each interval to sort the intervals, for example, by the vector (hash(bin),hash(interval+bin)). This effectively randomizes the start and stop times of each distributed resource to minimize "ripple" in the rate of discharge.

Next, in step 730, a bin index B(i) and a starting offset time S(i) are assigned to each interval in F. Intervals for non-full bins (G) are scheduled by stacking them end-to-end, and letting them wrap around the time window T shown in FIG. 5:

$$\text{Let } b = \max(B) + 1$$
$$\text{Let } p = 0$$
$$\text{For each G:}$$
$$\quad \text{if } p >= T:$$
$$\quad\quad p := p - T$$
$$\quad\quad b := b + 1$$
$$\quad B(i) := b$$
$$\quad S(i) := p$$
$$\quad p := p + I(i)$$
$$\text{NumBins} := b + 1$$

If S(i)+I(i)>T, the event is split across the time window such that two discharge events are created with start time and duration: (S(i), T−S(i)) and (0, S(i)+I(i)−T). Otherwise the discharge event is simply (S(i), I(i)).

At the end of this step, discharge events can be created from all intervals such that the total dispatch at any time does not vary more than a ratio of (1/NumBins) across the time interval T.

Next, the start and stop times are further redistributed 730. Since the intervals are of discrete size, their boundaries will tend to line up at discrete time intervals. Multiple simultaneous discharge start or stop events may create undesirable "ripple" on the grid. This can be smoothed by "tilting" the schedule. Each interval has been assigned a start time S(i) and a bin index B(i). The tilt is defined by adding a fractional part F(i) to each interval:

$$F(i)=B(i)/\text{NumBins}$$

The final start time for an interval is defined as: S(i)+F(i). This will add a ramp-up and ramp-down period for all discharging resources. The ramp-up and ramp-down time lasts exactly one time unit, and the total dispatch power will approach a linear curve. By adding this offset, the number of device transitions over each time quantum is no more than (NumBins*2). Also, by adding this offset, there will never be more than two device transitions that are less than (1/NumBins) time units apart (device transitions will always occur in pairs).

Figure 6:
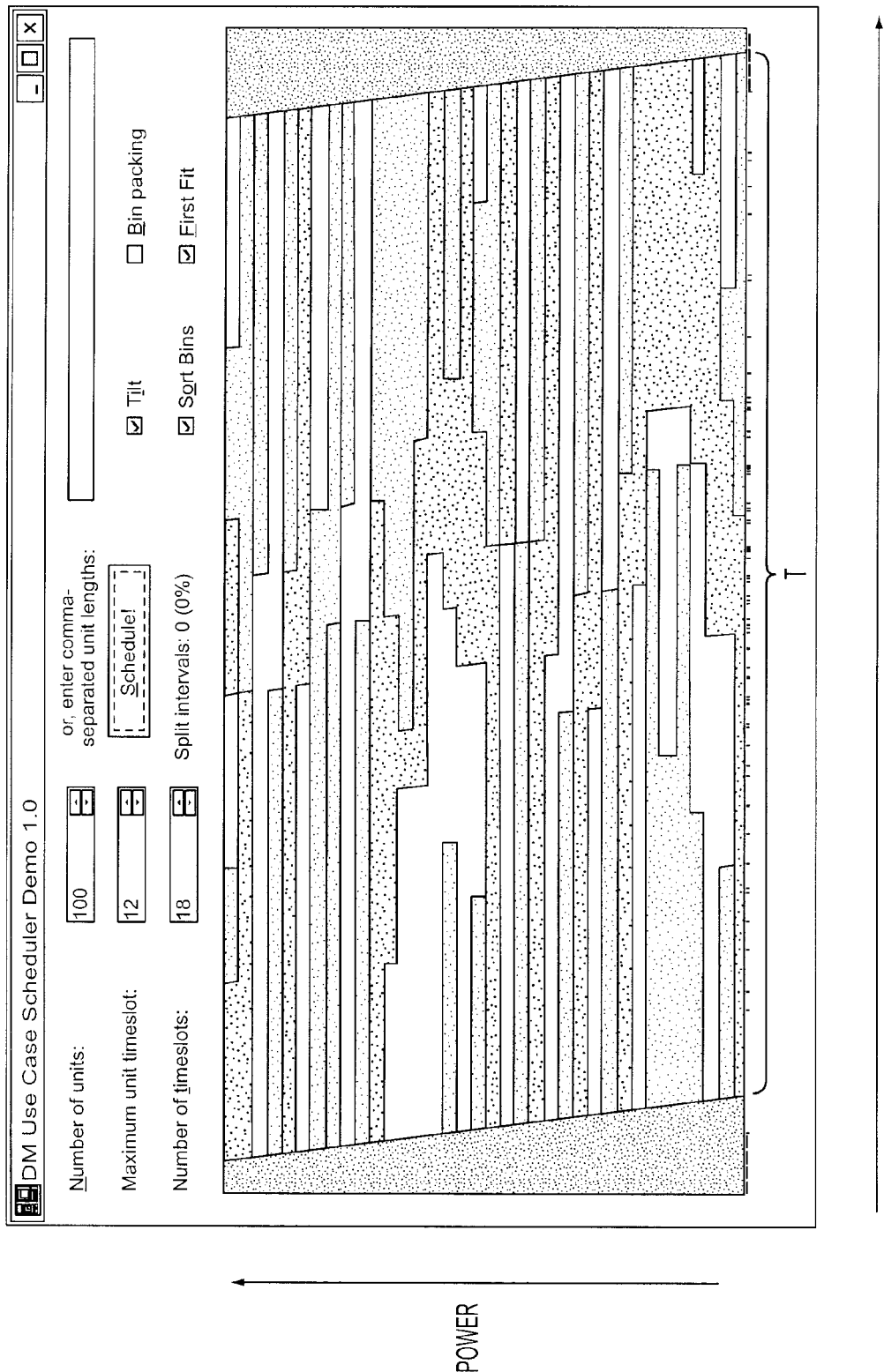
FIG. 6 shows another method of scheduling the dispatch of distributed resources.

FIG. 5 shows a graphical view illustrating scheduling of the dispatch of multiple resources over time, where over 25% of intervals were required to split, such as interval 820. FIG. 6 shows a graphical view illustrating scheduling of the dispatch of multiple resources over time, where interval lengths are uniformly distributed. Note that no intervals were required to split.

The discharge scheduling method disclosed above can include several variations from that described. The method of redistributing intervals after the bin-packing step can be varied. Also, the "tilt" step may be omitted, eliminating the ramp-up and ramp-down time at the expense of uneven state transitions.

The examples above assume that distributed resources have constant and identical dispatch rates. However, the method may be adapted to distributed energy resources with varying discharge rates. For example, a slightly modified definition of accomplishability may be used in step 520. Similarly, in the step of determining participation information 530, distributed resources may be levelized on the basis of their potential discharge duration. In addition, the step of scheduling 540 may be modified to account for variable discharge rates.

In one embodiment, slightly modifying the step of determining accomplishability 520, $$K \le \sum_i \min\left(\frac{E_i}{d}, Y_i\right)$$

permits a comparison of each distributed resources' individual dispatch rate $Y_i$.

Similarly, in one embodiment, in the step of determining individual resource participation 530, to levelize distributed resources with varying dispatch rates, the stored energy in every resource should be brought to a state where each resource has a fraction of the total remaining energy of all available resources proportional to its dispatch rate:

$$E_i = \frac{Y_i}{\sum_i Y_i} E_{total}$$

Participation information for each available resource may thus be determined by prioritizing resources based on each unit's potential discharge duration, such that the longer a resource may discharge its stored energy, the greater its level of participation.

In addition, in one embodiment, in the step of scheduling the dispatch of individual resources 540, resources may be grouped by individual rate of dispatch and "bin-packed" by group in accordance with the method described above. This may result in a difference between the amount of energy requested in the dispatch request and the amount actually delivered in the dispatch event; however, the difference in the dispatch duration and dispatch rate decreases as the number of participating resources increases. Specifically, the maximum %-error is:

$$\% \text{ error} = \frac{Y_{max}}{K}$$

where $Y_{max}$ is the maximum output rate of any unit and K is the total dispatch rate. For example, if 100 resources are scheduled for dispatch of a total dispatch of 330 kW and the maximum discharge rate is 6.6 kW, then the percentage error is only 2%. It will be evident that as the number of participating resources increases, the margin of error will decrease.

Dispatch events may be requested in advance of the time of the desired dispatch. However, the longer the interval of time, the greater the chance that the condition of at least some distributed resources may change. For example, distributed resources may have become disabled, or in the case of mobile energy storage, the distributed resources may be removed from the grid.

It is therefore desirable to re-evaluate the accomplishability of a utility-commanded dispatch event repeatedly between the time the dispatch request is initially made and the start of the dispatch event. Such re-evaluation provides the utility control system operator lead time to act on a notification that a previously accomplishable event is now no longer accomplishable because of a change in circumstances. Conversely, repeated evaluation of accomplishability may also show that an event that was unaccomplishable when scheduled has become accomplishable without any further interaction by the operator. For example, distributed resources may have been charged, or additional mobile energy storage may have become available for dispatch.

It is also desirable to perform an accomplishability check when a new dispatch event is created or canceled. When a new event is created, it may affect the accomplishability of subsequent dispatch events. For example, creating a new dispatch event before other dispatch events may cause the later dispatch events to become unaccomplishable (for example, due to a lack of available energy). On the other hand, the cancellation of a dispatch event may make later dispatch events accomplishable.

Instructions for dispatching energy from distributed resources may be computed based upon the state of each distributed energy resource at a specified point in time. The determination and generation of these instructions may be referred to as processing the event. The generation of instructions for individual resources may be deferred until as near to the desired start time of the event as possible, and then evaluated for accomplishability up to the time of event execution.

Reevaluation of accomplishability allows use of the best possible data as an input (e.g. the data closest to the start time of the event). Reevaluation also facilitates the implementation of event cancellation, out of order event scheduling (i.e. the ability to submit events in an order other than the one in which they will be executed); and maximum lead-time notification that an event has become unaccomplishable.

The latest possible moment that a background task can process an event and still expect that all the resources will be able to download and execute the corresponding instructions successfully is a function of how frequently the control system communicates with the distributed resources. If individual resource instructions are determined too late, then there may not be enough time for the participating resources to receive instructions prior to the dispatch event start time, and the event will fail to fully execute.

In an embodiment, in order to both defer event evaluation and repeatedly evaluate the accomplishability of events, a process, such as a software process (co-located with the control system in utility control center 105 in one embodiment) may perform event evaluation. Instructions for individual distributed resources are determined no later than the sum of the following durations prior to the start of the event: (a) the frequency at which the background task runs (evaluation frequency); (b) the duration it takes for the background task to complete; (c) the communication frequency of participating resources; (d) the time it takes for the instruction transmission to complete; and (e) other implementation-specific delays. Since some of these intervals may vary, implementation-specific maximum values should be chosen.

Deferred evaluation and re-evaluation of accomplishability allows the cancellation of events that have been submitted to the control system, but for which individual resource instructions have not yet been determined and transmitted to distributed resources. Re-evaluation of accomplishability also permits the scheduling of events that are currently unaccomplishable, but which the operator knows will become accomplishable by the desired execution time, increasing the operator's flexibility in scheduling events.

It is important for a control system operator to know what upcoming events are not currently deemed accomplishable and thus require remediation. In order to confirm a cancellation of an event, a confirmation dialog may be presented, for example, that identifies the event and displays the event's duration, start time, and end time. An operator may similarly be notified of a successful or an unsuccessful cancellation of an event. For example, notifications can be displayed to the system operator on display 115, for example, in a list that is always visible. Notification may also be done, for example, on a schedule or dashboard view, which quickly conveys information to an operator about events scheduled to take place in a given time period. Notifications may also be presented through visible cues on the schedule that indicate unaccomplishable events in the time period of interest. Notification may also be performed via messaging, such as by email, fax, pager, instant messaging, or automated voice mail. In an embodiment, unaccomplishable events are distinguished from accomplishable ones by color, highlighting at-risk events to a system operator.

The systems and methods heretofore described may be applied to mobile distributed resources, such as PEVs. However, the mobility of such resources creates issues not posed by non-mobile resources.

Individual owners of PEVs may use the storage capability of the PEV as part of an electricity use management system, such as that shown in FIG. 1. Mobile energy storage may be charged during non-peak hours, thus reducing the total cost of electricity, and electricity can be sold back to the grid during favorable conductions. An example of a system which permits the rescheduling of deferrable electrical consumption to off-peak hours is described in U.S. patent application Ser. No. 11/144,834, entitled "Optimized Energy Management System," filed on Jun. 6, 2005.

Individual owners of mobile energy storage systems may also permit utilities to control when the systems are charged or discharged. Mobile energy storage may be connected to a system such as that illustrated in FIG. 1. In addition, mobile energy storage may be connected to a system such as that illustrated in FIG. 7. Mobile energy storage may thus become another distributed energy resource on the electric grid.

However, the integration of mobile energy storage into the system introduces additional issues of availability of the resources and accomplishability of a utility-commanded dispatch event. By its very nature, mobile energy storage is connected and disconnected from the electrical grid. A dispatch might be accomplishable with the mobile energy resources that are connected at one point in time, but may cease to be accomplishable if enough resources are removed from the grid without offsetting arrivals. Minor modifications to the steps of method 500 address these issues.

To levelize and schedule the dispatch of mobile energy resources, for example, use of a statistical method in step 520, supplemented by information regarding the historical arrival and departure of mobile energy resources from a specific location, permits the determination of the probability that a utility-commanded event utilizing mobile energy storage is accomplishable. Such a statistical method may be used to determine the availability of energy from mobile resources at a given location. In an embodiment, a statistical method may use data such as the number of mobile resources which historically enter and leave a location during a given time period, the price of electricity (which may be a price offered by a utility, as further described below), and weather conditions (such as rain or snow) or seasons (such as whether is it summer or winter) which may affect mobile resource availability. A statistical method may also account for the day of the week and the time of day, which may affect availability of mobile resources, for example, at a shopping mall or at a commuter mass transit station parking lot. A statistical method may also account for holidays and for other events which may affect the availability of mobile resources at given locations.

In an embodiment, a statistical method may use a historical distribution for a given time period, to determine the available resources for intervals of time within the duration of a requested dispatch (each interval being a "timestep"), then to compute the accomplishability of a requested dispatch by determining accomplishability at each timestep.

In another embodiment, the number of arrivals may be modeled as a Poisson distribution, and the number of departures may be modeled as a set of Bernoulli trials, to provide a prediction of the number of arrivals and departures of mobile resources at a given location. Historical arrival data, for example, for the distribution of resources, and the amount of stored energy available, may then be used to weight the distribution of the predicted arrivals and combine their distribution with the number of mobile resources actually available at a given time. The predicted distribution is then used to compute accomplishability for each timestep. In an embodiment, a Markov Chain Monte Carlo simulator is used to rapidly compute accomplishability.

In another embodiment, the techniques described above may be combined, so that the result of the calculations is a weighted average of the results.

Relatively small timesteps may be used in the determination of participation information and the scheduling of dispatch events to minimize the probability that distributed resources may become unavailable.

In an embodiment, a dispatch event using mobile distributed resources is created in utility control center 105, including specifications as discussed above. Next, the accomplishability of the dispatch request is determined using a statistical method to determine the availability of mobile distributed resources. Next, if the dispatch request is accomplishable, the amount of energy to be discharged from each participating unit is determined, and then the energy dispatch of individual units is scheduled and the instructions for each distributed resource are determined. The length of the timesteps should be selected to minimize as much as possible the number of resources which may be removed from the electrical grid during a dispatch event, and yet reasonably minimize the computation time required. The precise length of the timesteps can be determined, for example, with reference to historical data about the arrival and departure of resources from a location. In an embodiment, the accomplishability of a dispatch event may be increased by the inclusion in the calculations of a "reserve" of mobile resources, to provide a buffer of redundancy in the determination of accomplishability.

To account for transactions in which utilities buy stored energy from or sell energy to PEV consumers, a method is required for settling an account with an owner of mobile energy storage for electricity charged or discharged at any location.

Figure 8:
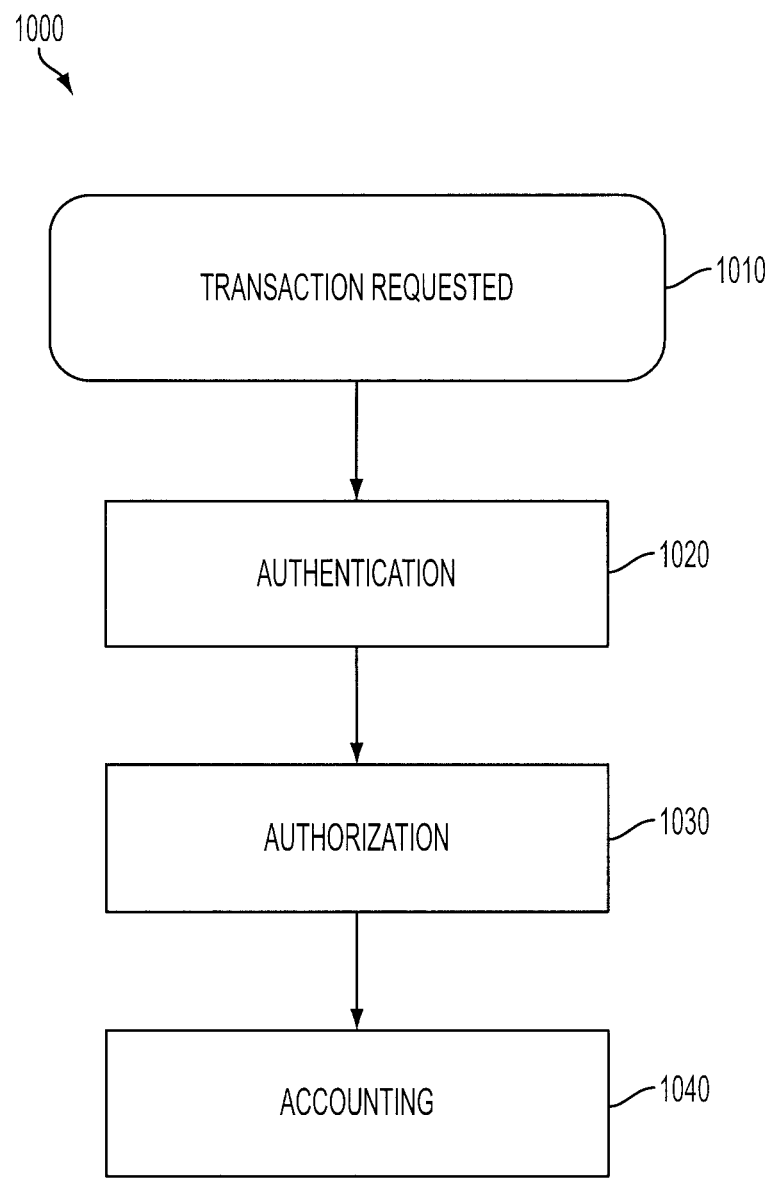
FIG. 8 shows a block flow diagram of a method of accounting for a transaction involving the dispatch of energy from distributed energy resources.

With reference to FIG. 8, when a transaction is requested 1010, first the PEV owner is authenticated 1020. Next, the transaction is authorized 1030. Finally, the accounting for the transaction is performed 1030. These steps are further described below.

Figure 7:
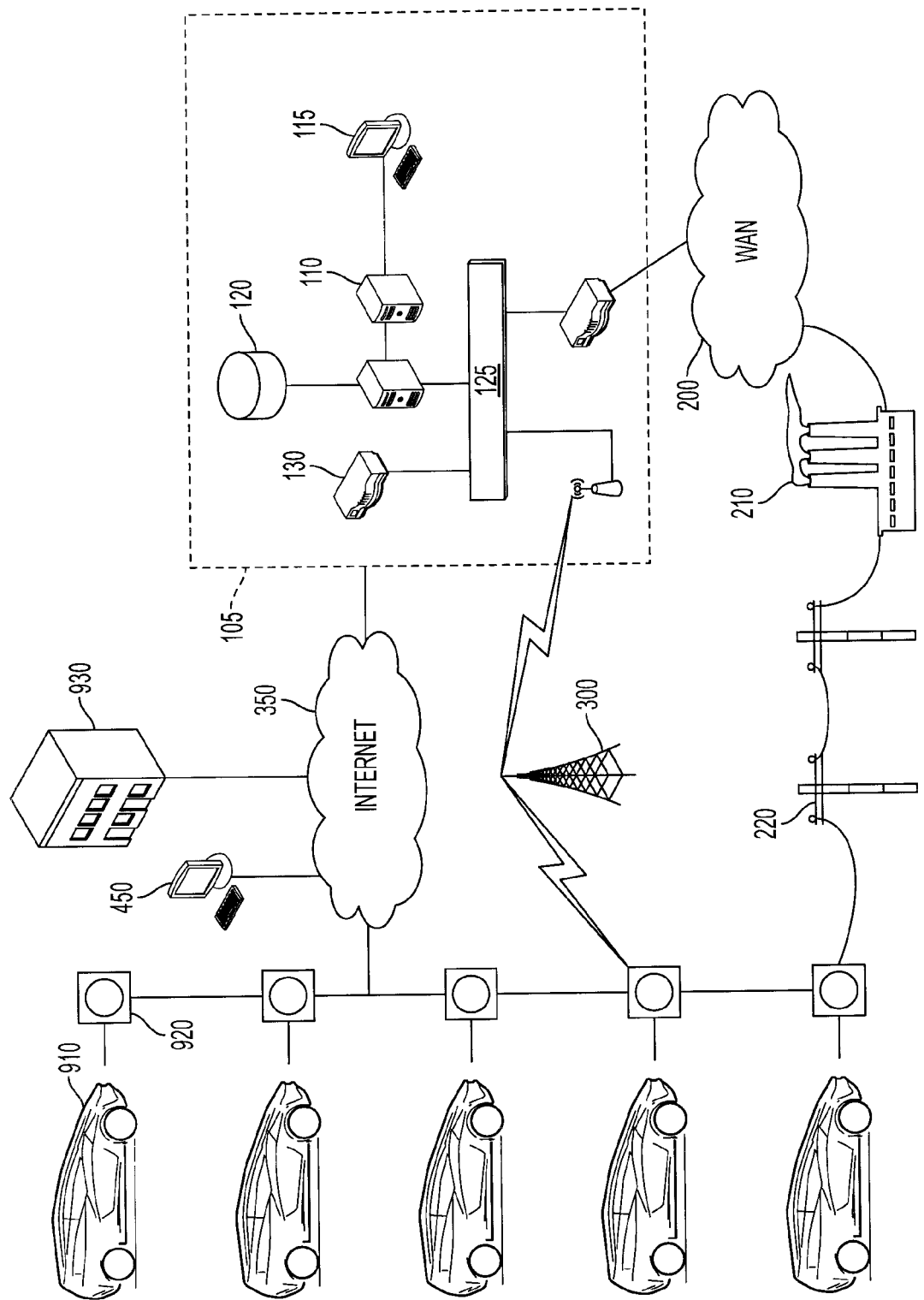
FIG. 7 illustrates a system capable of supporting the dispatch of energy from mobile distributed energy resources.

For example, a PEV owner may drive to work and park in an office parking lot, as may be represented by the grouping of PEVs 910 shown in FIG. 7. The PEV owner may plug in his vehicle and identify himself to the charger. This could be accomplished, for example, by use of a charging receptacle 920, enabled with a device permitting the owner of the mobile storage unit to use, for example an account number or other unique identifier, or swipe a credit card, for identification. Similarly, the mobile resource itself may provide identifying information to the charging receptacle. The mobile resource may communicate with the charging receptacle using a wired connection, or using a wireless protocol such as WiFi, Bluetooth, or ZigBee. In an embodiment, a unique identifier is associated with the mobile energy resource. Examples of unique identifiers include an IP address (such as using IETF RFC 2460); a vehicle identification number or VIN (such as using ISO standard 3779); a credit card number; and a personal identification code. The unique identifier may be associated with the electricity billing account of the PEV owner's home. Or, it might be associated with an account established expressly for the purposes of the mobile energy resource. The unique identifier is also associated with the record of electricity consumption or dispatch, which may include the amount of electricity consumed or dispatched, the location, the time, and the applicable rate or rates for the electricity.

Receptacle 920 may be any type of location configured to charge or discharge energy from a mobile energy resource, and can be, for example, at a commuter train station, or a shopping mall, or a public performance venue, or an athletic stadium, or any other similar location. Receptacle 920 may be in any location capable of accommodating mobile energy resources, and the exemplary use of a municipal or public parking location is in now way intended to be limiting.

In step 1030, a transaction is authorized. For example, if the mobile resource is plugged in to recharge outside of its home service territory, the utility providing the electricity may use the unique identifier to confirm with the consumer's billing entity that a transaction should be permitted. A variety of levels of permission may be granted. For example, the home billing utility might approve a transaction, but only up to a certain amount; or, the transaction could receive blanket approval; or, authorization could be denied, for example if the consumer is delinquent in bill payment, or if the consumer's billing utility does not have an arrangement with the utility requested to sell or purchase electricity. Similarly, mobile devices reported stolen may appear on a blacklist, and can be denied authorization to charge or dispatch. Ideally authorization should occur in real or nearly real-time.

A transaction may also be authorized if a utility requests the dispatch of energy from the mobile resource. In that case, information about the mobile resource and the owner's account information is verified, to permit a credit to be made to the mobile resource owner's account if energy is purchased and discharged from the mobile resource.

In step 1040, accounting for the transaction is performed. If the mobile resource is physically within the service territory of the utility associated with the billing account, a record of the unique identifier and electricity exchange may be readily attached to the resource owner's billing account. However, the location of charging receptacle may be in the service territory of a different electrical utility company, and settlement of a transaction in another service territory may be handled directly between utility companies. Alternatively, multiple electrical utilities may provide and receive information from a central clearing house 930, which may receive, store, and provide unique identifier and transaction information to the relevant utilities. Information relevant to the transaction may be provided to the central clearing house over the Internet 350. Central clearing house 930 may, for example, have a database of unique identifiers matched to billing electrical utilities. The central clearing house may sort records appropriately, and on a batch or real-time basis distribute them to the correct electrical billing company for billing to the consumer. A consumer's bill could thus contain roaming records from multiple companies combined by the home company and presented to the consumer. Utilities may charge different electricity rates for residential or commercial customers. In an embodiment, a separate rate may be applied for "roaming" charges.

Similarly, a credit maybe applied to the mobile resource owner's account if energy is purchased by a utility and discharged from the mobile resource. In an embodiment, a mobile resource owner parks her vehicle at a parking lot in an office building in a parking space enabled with a charging receptacle as described above. The owner swipes her credit card on the charging receptacle to identify herself. The mobile resource then establishes a wireless connection to the charging receptacle and provides information about itself. The energy stored in the mobile resource is now available for discharge. Later that day, the utility in whose service area the mobile resource is parked initiates a dispatch request to the owner's mobile resource. Using the information earlier provided, the transaction is authorized and energy is dispatched from the mobile resource. A credit is applied to the mobile resource owner's account for the amount of energy dispatched. The system may take into consideration multiple charge or discharge conditions. For example, the owner may have indicated to the system, through an interface on the mobile resource, or through user interface an interface such as on display device 450, that she wishes to fully charge the mobile resource. Alternatively, the mobile resource owner may have granted access to the mobile resource such that the utility, in order to prepare for a discharge event, the utility may charge the mobile resource. The systems and methods described above may account for multiple charge and discharge events, and thus multiple transactions.

The pre-existing onboard systems of the vehicle may be leveraged to provide roam charging capabilities such that a single invoice can be presented to the customer independent of where they recharge their vehicle. An automobile's onboard telemetry system for navigation and safety monitoring, an example of which is the GM OnStar system, can be utilized in this respect. These systems have cellular telephone-based communications systems combined with on-board diagnostics that can convey the health and status of the vehicle along with "black box" data such as speed and g-force load sensor information prior to an airbag deployment. For smart charging and roam charging applications of PEVs, these on-board telemetry systems combined with an on-board user interface such as the navigation system, can be used to have the PEV interact with the grid.

Such systems may be configured to operate as follows. When a user turns off the car, a pop up menu within the navigation screen asks the user if they will be plugging the vehicle in for re-charging at home or at another location. If the user responds in the affirmative, then the system further asks if the user is going to "smart charge" the vehicle. If the response is again affirmative, the vehicle communicates with the network operations center for the on-board telemetry system to request the charging parameters for that particular instance. The network operations center interfaces with a private service provider's network operations center (NOC), which in turn interfaces with the integrated resource planning system of a utility company to determine the optimum charging routine for the vehicle based upon least cost algorithms across the fleet of PEVs within the service territory of the utility.

Once the vehicle receives the charge timing parameters, and the user has plugged the vehicle into the electrical outlet, the vehicle will not draw power from the outlet until the start time is achieved. Using the on-board clock of the vehicle, it begins charging according to the set parameters through direct control of the power electronics onboard the vehicle. If the user selects not to use the smart charging, then the onboard display within the vehicle may notify the use that they may be paying a premium rate to charge the vehicle, with appropriate acknowledgement, specific to the utility-defined program.

If the user has chosen to roam charge the vehicle at a location other than their billing address, then the onboard system may ask the user to verify their location as determined by the GPS system. User verification of address is then captured, transmitted to the vehicle system NOC, and on to the service provider's NOC for capture of a billing event data set. This information is then sent on to the utility's billing system to debit the account of the user while crediting the account of the customer where the vehicle is being charged. This solution can be applied within residential, commercial or municipal parking areas.

The onboard menu system may also allow the combination of roam charge management with smart charge parameters to delay the start of vehicle charging to match the tariff schedule of the user as defined by the utility program.

Within this approach, there is required modified software on the on-board vehicle system, a NOC to NOC interface between the vehicle systems operations center and the service-provider's operations center and a systems integration with the utility operational environment. In this manner, no end point hardware is required.

The systems and methods described above further permit numerous additional applications. For example, utility operators may command distributed mobile energy resources as they might other resources on a network, to reduce load or to add capacity to the electrical grid. One benefit of integrating mobile energy storage in such a manner is that mobile energy storage can be used to provide additional stability to the electrical grid.

However, owners of mobile storage must choose to make their mobile energy storage available to utility operators. Market applications of the system and method are therefore not only possible but highly desirable. Moreover, incentives may be offered not only to individual consumers but also to entities controlling more than one mobile resource, such as municipalities, car rental companies, taxi companies, or any owner of a fleet of PEVs. The systems and methods disclosed herein may thereby provide incentives related to fleet management. The examples described below may therefore be applicable to consumers and to entities, and the use of one in an example is not intended to exclude any applications or use with the other.

For example, with reference to FIG. 7, a parking lot, such as a municipal parking lot at a mass transit station, can be enabled with charging facilities 920 for mobile storage, such as PEVs 910. Further, the charging facilities (such as a "smart charger" device) may be enabled to identify the consumer or the specific resource, as described above. By identifying themselves to the charging facility, consumers may choose to make the storage capacity of their mobile storage available for command as a distributed energy resource. A plurality of PEVs able to be commanded by a utility operator may serve as a significant source of stored electricity available for dispatch, and can be dispatched using the systems and methods described above. Indeed, a number of commandable PEVs may collectively serve a utility as a "virtual power plant," providing a significant amount of energy available for dispatch.

The utility has a clear motivation to incentivize consumers to participate, because the amount of energy made available to the utility for dispatch is potentially substantial. The utility may reap financial benefit from the arrangement, for example, because it may avoid bringing additional generation capacity online to provide needed electricity. The additional capacity made available by numerous available distributed mobile resources may also aid in stabilizing the electrical grid through the availability of the stored capacity. The use of the methods of levelizing and scheduling the requested dispatches conserves the capacity of multiple distributed mobile resources, as well as minimizing "ripple" across the grid which may occur as a result of closely occurring dispatch starts or stops.

A variety of incentives may be offered. For example, a municipality may offer discounted mass transit tickets or other discounts to consumers who park their PEVs at municipal parking lots and take public transportation. Such discounts or coupons can be offered at particular times of day. The discounts or coupons can also be offered seasonally, or at any time when the need for the availability of additional electricity exists. For example, hot summer weather may create demand for additional electricity to meet the needs of numerous HVAC units in operation. Consumer incentives may be offered to draw PEV owners to make their mobile energy capacity available, for example, at a municipal parking lot. The utility stands to gain by purchasing the PEV stored capacity at a fraction of the cost of bringing additional generating capacity online.

The owners of private parking facilities may also provide incentives to consumers to make their mobile storage capacity available. For example, the owner of a parking lot at a shopping mall may offer consumers a discount at a store or stores within the shopping mall to PEV owners who park their vehicle at the shopping mall lot and make their mobile storage capacity available for dispatch. In an embodiment, a consumer receives a message on user interface 1100 offering a discount at a particular store in a shopping mall in exchange for making the storage capacity of his mobile device available for dispatch, for example, on Saturday between 10:00 AM and 2:00 PM. The consumer uses the user interface 1100 to accept the offer, which causes data indicating such acceptance to be transmitted back to the utility company or a third party service provider. The consumer then drives to and parks at the shopping mall at a charging facility at the appointed time, provides identification information to the charging facility, and makes his mobile resource available for dispatch, as described above. The shopping discount may be applied in any number of ways. For example, the consumer's identifying information may be provided electronically to the store so that if the consumer makes a purchase, the discount is immediately applied to the transaction. The consumer may be required to make his mobile resource available for a minimum amount of time in order to receive the discount.

The available energy may be used in any number of ways. For example, the energy made available may be used to power a store, or a building. The mobile energy resources available in an office building parking lot, for example, may be used to power the office building at peak prices times, or to at least decrease the load on the grid created by the building. Private parking facilities may require retrofitting of existing parking, or the provision of new parking, equipped with charging receptacles and the means to identify consumers, as described above. However, the incentive of a utility to enter into economic arrangements with private parking lot owners is high, and a utility may subsidize or pay entirely for the creation of new parking or the retrofitting of old parking to accommodate PEVs as described herein.

Utilities and other entities may therefore use consumer incentives to draw mobile energy resources to specific locations or at specific times. Specific locations and times may be determined on the basis of historical or predicted need, or on predicted availability of mobile energy resources, using the method described above. Furthermore, incentives may be offered to PEV owners to discourage driving.

Incentives may be built around considerations such as environmental factors. For example, if a weather report indicates that a particular day is going to be smoggy, utilities may offer incentives to PEV owners to park at municipal lots and ride public transportation. Similarly, a utility or other entity may offer an incentive to consumers not to drive at all on such a day. Such incentives may be offered, for example, on the same day at different price points. For example, on a day of heavy smog, consumers may be offered a lower incentive for parking at a municipal lot and using public transportation, and a higher incentive for staying home and not driving at all. It may be that consumers capable of telecommuting may benefit more than other consumers. This may in turn create pressure on employers to permit greater telecommuting, which may have an additional and incrementally greater environmental benefit. Similarly, the emissions of a PEV may depend on the state of health of the battery, or on its level of charge. By taking environmental variables into account, the systems and methods may be used to provide behavioral incentives which tend to control auto emissions.

Figure 9:
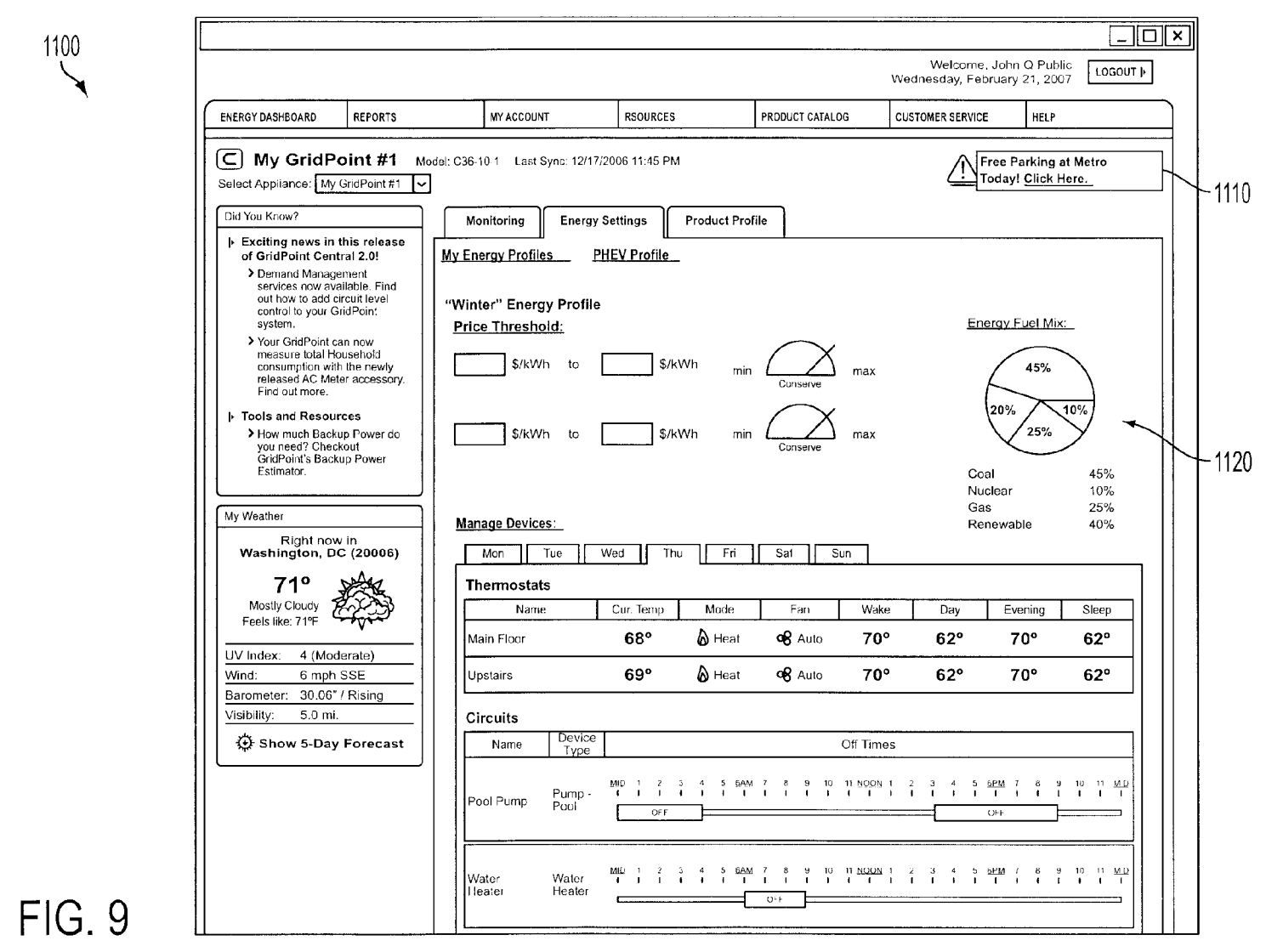
Figure 10:
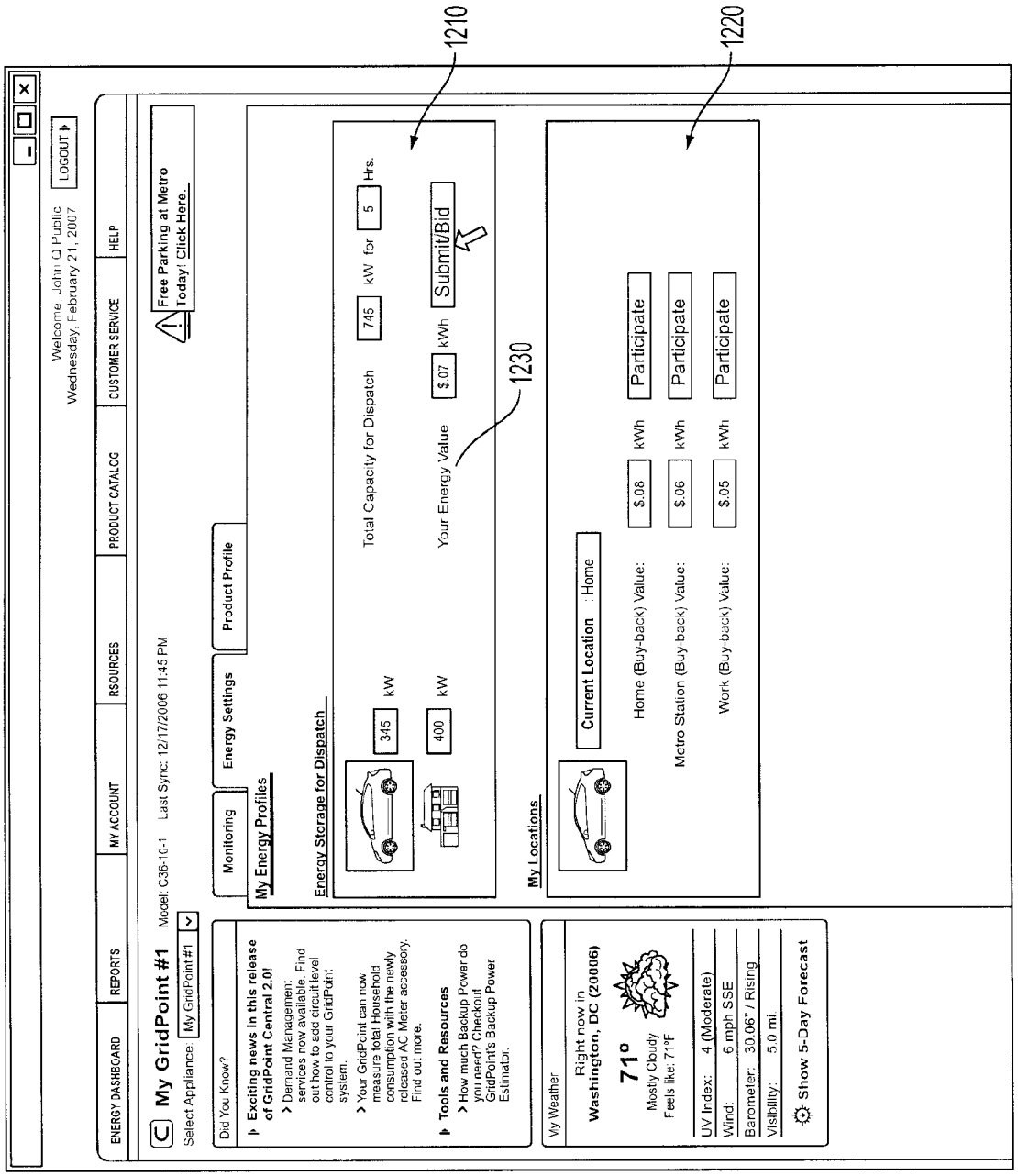
FIG. 10 shows another example of a user interface.

With reference to FIGS. 9 and 10, in an embodiment, the utility sends a message to participating consumers in its service area. Such message may appear, for example, on user interface 1100 in FIG. 9, which displays messages 1110 to a user. A consumer may choose to participate by making a selection in user interface 1200. Similarly, a consumer may choose to participate by making her mobile resource available at a parking location as described above.

One way to permit incentives to be included in the systems and methods described herein is to include a cost value in the step of determining participation information. Cost values may be assigned by a utility, or by the owner of a mobile resource. Cost values may also be determined algorithmically. For example, an electrical utility may determine a value for the energy discharged from, or used to charge, a mobile energy resource. As shown in FIG. 10, a utility may, for example, offer a lower cost value for electricity discharged from a mobile resource at a downtown office location, a higher cost value for electricity discharged from a mobile resource at a mass transit parking lot, and a yet-higher cost value for electricity discharged from a mobile resource at the owner's home (1220). The variable pricing thus provides an incentive for the mobile resource owner to reduce driving (by only driving from home to a public transportation lot) or to eliminate it (by not driving). Additional incentives are possible. For example, a utility may enter into an agreement with a municipality, and may offer additional incentives to ride public transportation, such as discounted mass transit tickets, or discounted parking at a mass transit station. A utility may thereby create incentives for mobile resource owners to make their mobile resources available at particular locations and at particular times.

A utility may also enter into arrangements with other commercial entities, or with municipalities or other governmental organizations, and provide incentives to such larger entities. For example, a utility may offer an incentive, such as discounted electricity, or favorable billing rates, to a municipality to make its vehicle fleet of mobile energy resources available at a particular location or at a particular time. The utility make provide levels of incentives, for example, in accordance with the greatest need for electricity at on a particular day, or at a particular time. The utility may thus use incentives to align the needs of a private or public entity with the needs of the utility to match energy supply to energy demand.

Utilities and other entities may apply other incentive schemes to motivate consumer behavior. For example, a utility may offer a sweepstakes style incentive, wherein, for example, the first five thousand consumers who "enter"—by making the mobile energy capacity available for discharge—eligible for a prize of monetary value, or of some other value. A message 1110 may be sent to consumers, who may elect to participate, for example, by making a selection in a user interface 1220. Similarly, utilities seeking to motivate consumers to participate in a dispatch event may offer incentives in increasing steps until the desired amount of participation capacity is met. For example, a utility seeking to dispatch the amount of energy that may be stored in, for example, one thousand PEVs, may offer to pay one price for energy, which may draw four hundred participants. The utility may later offer a higher price, for which an additional three hundred participants may join. The utility may offer a yet higher price for stored energy at a later point in time, at which price the remaining three hundred participants are motivated to make available their mobile stored energy capacity. A Dutch auction method may also be employed to determine the lowest clearing price of energy desired by a utility. For example, a utility may send a message, to be displayed in user interface 1100, stating its desire to purchase 5 MW of energy. Consumers may enter a value for their stored energy and place bids 1230 through user interface 1100. The utility may then purchase the desired 5 MW of energy at the lowest price at which the entire 5 MW is purchasable from the consumers who have placed bids.

Where owners of mobile energy resources are permitted to indicate a cost value for their stored energy, utilities may respond to owner-indicated values, and an electronic marketplace for stored energy may thus be enabled by the systems and methods herein described. For example, an owner may place a value at which the owner is willing to sell energy to a utility and make it available for discharge. The owner may indicate a value through a user interface on the mobile resource, or through user interface 1200. A utility seeking to dispatch energy from mobile resources may, for example, order the available resources in its service territory by the average price of energy per resource, then select resources for participation in a dispatch event from among the lowest price set of resources with a high probability of accomplishability. A utility may also discharge smaller amounts of energy from resources with higher priced energy and larger amounts of energy from higher priced energy. A utility may respond to owner-set prices by increasing or decreasing the price it is willing to pay to purchase stored energy from mobile resource owners, for example by increasing the price it is willing to pay in order to gain access to a larger number of resources, or decreasing the price it is wiling to pay if a surplus of lower cost mobile storage is available. Mobile resource owners may similarly vary the cost values which they assign to their stored energy.

Cost values may be determined for other criteria as well. For example, a value may be assigned based on the source of energy used to generate the stored electricity, such as a from a coal power plant, or from a nuclear power plant, or from a renewable energy source such as wind or solar. The distribution of types of energy stored may be presented 1120, and mobile resource owners and utilities may, for example, select preferences for energy generated using cleaner forms of generation. For example, a utility may offer to purchase at a higher price stored energy generated from renewable sources, such as energy generated from solar panels on a resource owner's home. Similarly, a resource owner may, for example, offer to purchase from the utility energy generated from renewable sources at a higher price, creating an incentive for the utility to use renewable energy over non-renewable sources.

A cost value for energy may also be determined algorithmically by the system. The cost value may take many variables into account, including time-of-day pricing, the price of gasoline, and the usage of gasoline in charging the battery. A value may also be assigned or determined based on the carbon emissions associated with the energy stored. Similarly, carbon credits may also be assigned a value, or the system may be configured to account for carbon credits independent of an assigned value.

Utilities may thus provide incentives to reduce emissions, by providing an incentive to consumers to curtail driving. A utility may similarly use incentives offered to larger entities, such as companies, parking lot owners, and municipalities, for similar aims. In addition, a municipality may employ incentives in a similar fashion. For example, a municipality wishing to decrease smog during a particular summer week may offer an incentive to consumers to curtail driving, or to the utility to similarly incentivize consumers. For example, a municipality may make its vehicle fleet available to the utility for dispatch in exchange for the utility offering incentives to consumers to curtail driving, in order to drive down emissions.

The interface of FIGS. 9 and 10 may also be used to allow a utility to borrow stored energy in PEVs when they are plugged into the grid with a promise to return the energy at a later time with no consequence to either the driving pattern or cost to the consumer. The interfaces can allow the consumer to define their parameters for participation along with appropriate economic incentives and verification procedures. For instance, the consumer might define that they always want enough energy to get home under all electric power and that they live 15 miles away from work and leave work at 6 pm. The boundary condition defined by the consumer provides a window of opportunity for the utility, and when multiplied by hundreds of thousands of available PEVs can amount to significant peak energy availability.

In addition to providing an interface to the incentive functions discussed above, a user interface such as that shown in FIGS. 9 and 10 can also be used to allow the owners of mobile energy resources such as PEVs to define their driving requirements such as typical morning departure time, typical return time and their tolerance for peak vs. off peak pricing. A variation of this definition can include environmental requirements such that a consumer can specify the source of electricity used to replenish the stored energy in the PEV. Through software algorithms, the utility can match their resource planning needs to the needs of the consumer. It is possible to predict the daily load duration requirements of the PEV by measuring the actual energy consumed by the device and normalizing to day of week or other patterns of usage. This information can then be aggregated within the control system to load level a fleet of PEVs through staggered charge management routines. A more-advanced version of this scenario includes getting information directly from the energy storage device to state the need to the control system at that point in time, again with a staggered approach to the fleet of PEVs to load level the system. From a utility's perspective, the load leveling may be highly locational in nature to deal with distribution capacity and congestion issues. Therefore, the PEV must be provisioned within the control system in such a way that localized capacity can be managed properly.

The timing of when the PEV replenishes its energy storage may be controlled based upon a combination of time-of-use (TOU) pricing schedules and the integrated resource plan (IRP) of the electric utility. A schedule may be set for controlling the charge on or off state that matches the TOU schedule or the goals of the IRP. Separately, due to the seasonal nature of available capacity in many areas, direct price signals may also be used alone or in conjunction with TOU pricing schedules to control when a PEV is re-charged. This would allow a utility to provide unfettered re-charging during most of the year but utility-controlled during peak seasons. No human interaction or interface required.

While the TOU schedule is simple and effective, it may not be adequate for incentivizing consumers to participate in a smart charging program. Peak price schemas along with corresponding pricing signals broadcast to the network of participating devices may be required. Another method includes using value-based pricing in which the PEV is separately metered and has a unique tariff apart from the other devices within the home. This reduced tariff for the PEV (for example, $0.05 rather than the nominal $0.12) can provide a strong incentive to participate in a smart charging program while also optimizing the cost-benefit to the utility.

The gasoline tax is a major source of revenue for federal, state and local taxing authorities. Typically funds collected through the gas tax are applied (at least in part) toward maintaining roadways and other vehicle infrastructure. However, the increased adoption of PEVs will result in decreased use of gasoline, and thus a decrease in the associated tax revenues. To offset the loss of the ability to collect funds to maintain the roadway infrastructure, a method is required to tax the electricity used in powering PEVs.

The overall size of the tax may be determined by taking into account the funds required to maintain infrastructure, spread over the expected electricity required to power the extant PEV fleet. In the event that a carbon tax is also imposed, the pollution component of PEV use may be included in the marginal cost of energy.

However, simply levying a tax on electricity used to charge PEVs is unfeasible, because of the PEV's capability of discharging—and reselling—its stored energy back to the grid. Systems and methods such as those disclosed herein facilitate the tracking of the charging and discharging of mobile storage connected to the power grid. For example, information about the tax associated with the charging and discharging of electricity from a PEV's storage capacity may be stored by the PEV owner's electrical utility, or by a government entity, or at the point of sale of electricity, or at the point of sale of gasoline for the PEV, or through a network communication system such as OnStar. Such information may be transmitted, for example, between the PEV and the charging receptacle, as described above. Similarly, a gasoline point of sale may also have the capability to transmit and receive information from a PEV, for example, a WiFi, Bluetooth or Zigbee enabled device or hotspot, and may exchange such information with a PEV.

A range of options are available to a taxing authority for recapturing gasoline consumption tax revenue lost to PEV use. In an embodiment, the electricity delivered into PEVs is differentiated from that delivered to other devices. A system such as that described above may permit the identification of a PEV or its owner. A utility, or a data clearing house, or a credit card company, or a government entity, or another entity, may record data on how much electricity is delivered to a specified PEV. The data regarding charging may be reconciled against any discharges of energy to the grid performed by the identified consumer or PEV.

In an embodiment, a national transportation electricity accounting system may be provided. All electricity flowing into a uniquely identifiable PEV may be aggregated into a single account for the purposes of the transportation tax. This electricity could be further tagged with the appropriate regional tax information in the accounting system. The PEV electricity tax is a net tax, as electricity delivered back to the grid will be subtracted from the account so as to accumulate an amount equal to that which is used for transportation. The account will be separate from whatever process is used to pay the utility or utilities delivering the electricity. At the end of a given period, be it weekly, monthly, or quarterly, the net electricity used for transportation may be taxed electronically by the relevant parties.

In an embodiment, a differentiated tax may be imposed on gasoline purchased for a PEV owner than for a gasoline-only vehicle. The differentiated tax may be lower or higher than the tax imposed for a gasoline-only vehicle.

In an embodiment, a PEV owner may receive a reduction in his home electricity bill based on the tax imposed on electricity purchased for the PEV.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

The invention claimed is:

1. A computer program product comprising a non-transitory computer readable storage medium having computer readable program code embodied in the medium for implementing a method for dispatching energy from a plurality of distributed storage resources in a discharge event so that the energy stored in each of the plurality of distributed resources is levelized, the computer program product comprising:
    program code for causing a computer to receive a dispatch request comprising an amount of power required during a dispatch event and a duration of the discharge event;
    program code for causing the computer to determine accomplishability of the dispatch request, comprising:
        program code for determining an aggregate rate of discharge for the plurality of distributed energy resources based on the rates of discharge at which each of the individual resources of the plurality of distributed resources are capable of producing;
        program code for determining if the determined aggregate rate of discharge is sufficient to meet the amount of power required to satisfy the dispatch request;
        program code for determining if the determined aggregate rate of discharge can be maintained at all times during the dispatch event, and if so, identifying the dispatch request as accomplishable;
    program code for causing, if the dispatch request is determined to be accomplishable, the computer to determine the amount of energy to be discharged from each of the plurality of distributed resources during the dispatch event so as to reduce the variance among the stored energy levels of the plurality of distributed energy resources;
    program code for scheduling the dispatch of each of the plurality of distributed resources to participate in the dispatch event, the program code for scheduling the dispatch comprising:
        code for implementing a bin packing algorithm to select the start and stop times of the discharge of each of the plurality of distributed resources during the dispatch event, and
        code for tilting the dispatch schedule by adding a fractional time offset to intervals in each bin used by the bin packing algorithm;
    program code for sending dispatch instructions to each of the plurality of distributed resources to participate in the scheduled dispatch event.

2. A computer program product of claim 1, wherein the program code for scheduling the dispatch of each of the plurality of distributed resources, further comprising:
    program code for adding a ramp up time and a ramp down time to each distributed resource participating in the dispatch event, the program code ensuring that all ramp up and ramp down transitions of the plurality of distributed resources occur in pairs.

3. A computer program product of claim 1, wherein the program code for scheduling the dispatch of each of the plurality of distributed resources, further comprising:
    program code for prioritizing the participation of each of the plurality of distributed resources in order of their respective potential discharge duration potential.

4. A computer program product of claim 1, wherein the rates of discharge at which each of the plurality of resources are capable of discharging energy are approximately the same.

5. A computer program product of claim 1, wherein the rates of discharge at which each of the plurality of resources are capable of discharging energy are not all the same.

6. A computer program product of claim 1, wherein the variance among the stored energy levels of each of the plurality of distributed energy resources is maximally brought to a state where each resource has a fraction of the total remaining energy each of the plurality of distributed energy resources proportional to its discharge rate.

7. A computer program product of claim 1, wherein the amount of energy each of the plurality of distributed energy resources is capable of storing is approximately the same, and the variance among the stored energy levels of the plurality of distributed energy resources that is reduced is an amount of the total energy each of the plurality of distributed energy resources is capable of storing.

8. A computer program product of claim 1, further comprising:
    program code for periodically repeating the accomplishability step between the time the dispatch request was initially made and the start of the dispatch event, and if a dispatch request that was previously determined not to be accomplishable is now determined to be accomplishable, providing an operator making the request a notification that the dispatch request is now accomplishable.

9. A computer program product of claim 1, further comprising:
    program code for repeating the accomplishability step between the time the dispatch request was initially made and the start of the dispatch event, and if a dispatch request that was previously determined to be accomplishable is no longer determined to be accomplishable, providing an operator making the request a notification that the dispatch request is no longer accomplishable.

10. A computer program product of claim 1, further comprising:
program code for performing the accomplishability step each time a new dispatch request is created or cancelled, and if a dispatch request that was previously determined not to be accomplishable is now determined to be accomplishable, providing an operator making the request a notification that the dispatch request is now accomplishable.

11. A computer program product of claim 1, further comprising:
program code for performing the accomplishability step each time a new dispatch request is created or cancelled, and if a dispatch request that was previously determined to be accomplishable is now unaccomplishable, providing an operator making the request a notification that the dispatch request is no longer accomplishable.

12. A computer program product of claim 1, wherein the plurality of distributed resources are mobile energy resources and the program code for determining accomplishability further comprises:
program code for receiving historical arrival and departure times at a location of each of the plurality of distributed resources; and
program code for determining the probability that a dispatch request can be satisfied using plurality of distributed mobile resources based on the historical arrival and departure times of the plurality of distributed resources.

13. A computer program product of claim 12, wherein the probability determination is performed for regular time steps of the duration of the dispatch event to ensure that a sufficient number of distributed mobile resources will be available to satisfy the dispatch request during the duration of the dispatch event.

14. A computer program product of claim 13, further comprising:
program code for determining accomplishability using the historical data of the amount of stored energy available upon arrival at a location from each of the plurality of mobile distributed resources.

15. A computer program product of claim 14, further comprising:
program code for weighting a distribution of a predicted arrivals at that location with the historical amount of stored energy available upon arrival of a mobile resource at a location; and
program code for combining the weighted distribution with the energy available in distributed mobile resources that are actually available at a given time in order to compute accomplishability.

16. A computer program product of claim 13, further comprising:
program code for selecting the length of the time step length so as to minimize the number of distributed mobile resources that are removed from participation in the dispatch event while also minimizing the number of calculations resulting from the number of potential distributed mobile resources used to calculate the accomplishability.

17. A computer program product comprising a non-transitory computer readable storage medium having computer readable program code embodied in the medium for implementing a method for dispatching energy from a plurality of distributed mobile storage resources in a discharge event so that the energy stored in each of the plurality of distributed mobile storage resources is levelized, the computer program product comprising:
program code for causing a computer to receive a dispatch request comprising an amount of power required during a dispatch event and a duration of the dispatch event;
program code for receiving the historical arrival times, departure times, and stored energy available, of each of the plurality of distributed mobile storage resources at a location;
program code for predicting the number of arrivals, departures, and the amount of stored energy available for the plurality of distributed mobile storage resources during the dispatch event, the prediction being based, in part, on the historical arrival times, departure times, and the stored energy available for each distributed mobile storage resource;
program code for weighting a distribution of the predicted arrival times of mobile resources with the predicted amount of stored energy available for the plurality of distributed mobile storage resources and combining the weighted distribution with the number of mobile resources actually available;
program code for computing the accomplishability of the dispatch request by aggregating the combined weighted distribution at multiple time steps during the predicted dispatch and determining if the aggregate rate of discharge capability of each of the plurality of mobile resources is sufficient to meet the amount of power required to satisfy the dispatch request at each time step in the dispatch event, and if so, identifying the dispatch event as accomplishable;
program code for causing, if the dispatch event is determined to be accomplishable, the computer to determine the amount of energy to be discharged from each of the plurality of distributed mobile resources during the dispatch event so as to maximally reduce the variance among the stored energy levels of the plurality of distributed energy resources;
program code for scheduling the dispatch of each distributed mobile storage resource of the plurality of distributed mobile storage resources to participate in the dispatch event using a bin packing algorithm to select the start and stop times of the discharge of each of the plurality of distributed mobile storage resources;
program code for tilting the dispatch schedule by adding a fractional time offset to intervals in each bin used in the bin packing algorithm;
program code for sending the discharge instructions to the plurality of distributed resources according to the dispatch schedule;
program code for adding a ramp up time and a ramp down time to each distributed mobile storage resource participating in the dispatch event, the program code ensuring that all ramp up and ramp down transitions of the plurality of distributed mobile storage resources occur in pairs; and
repeating the accomplishability step each time a new dispatch request is created or cancelled, and if a dispatch request that was previously determined not to be accomplishable is now determined to be accomplishable, providing an operator making the request a notification that the dispatch request is now accomplishable, and if a dispatch request that was previously determined to be accomplishable is now unaccomplishable, providing a utility operator making the request a notification that the dispatch request is no longer accomplishable.

* * * * *